United States Patent [19]

Schiwy et al.

[11] 4,285,692

[45] Aug. 25, 1981

[54] GRANULAR PREPARATION OF VAT DYESTUFFS AND/OR DISPERSE DYESTUFFS

[75] Inventors: Willy Schiwy, Monheim; Jürgen Schulze, Leverkusen; Ferdinand Hummes, Bergisch-Gladbach; Peter Schulze, Leverkusen; Reinhold Hörnle, Cologne; Hans-Heinz Mölls; Harry Orttmann, both of Leverkusen, all of Fed. Rep. of Germany

[73] Assignee: Bayer Aktiengesellschaft, Leverkusen, Fed. Rep. of Germany

[21] Appl. No.: 81,968

[22] Filed: Oct. 4, 1979

[30] Foreign Application Priority Data

Oct. 24, 1978 [DE] Fed. Rep. of Germany ....... 2846149

[51] Int. Cl.$^3$ .......................... D06P 5/00; C09B 67/00
[52] U.S. Cl. ........................................... 8/499; 8/524; 8/526; 8/638; 8/642; 8/650
[58] Field of Search ................. 8/27, 34, 79, 499, 526, 8/524, 638, 642

[56] References Cited

U.S. PATENT DOCUMENTS

| | | | |
|---|---|---|---|
| 3,934,973 | 1/1976 | Shultz et al. | 8/524 |
| 3,960,486 | 6/1976 | Daubach et al. | 8/524 |
| 4,105,401 | 8/1978 | Koci et al. | 8/524 |
| 4,134,725 | 1/1979 | Büchel et al. | 8/526 |

FOREIGN PATENT DOCUMENTS

| | | |
|---|---|---|
| 1064924 | 4/1967 | United Kingdom . |
| 1069380 | 5/1967 | United Kingdom . |
| 1426053 | 2/1976 | United Kingdom . |

*Primary Examiner*—A. Lionel Clingman
*Attorney, Agent, or Firm*—Sprung, Felfe, Horn, Lynch & Kramer

[57] ABSTRACT

Process for the production of granular mixtures of vat dyestuffs and/or disperse dyestuffs, characterized in that liquid or pasty, finished formulations of two or more vat dyestuffs and/or disperse dyestuffs are spray-dried together to form granules.

7 Claims, No Drawings

GRANULAR PREPARATION OF VAT DYESTUFFS AND/OR DISPERSE DYESTUFFS

The present invention relates to a process for the production of granular preparations of vat dyestuffs and/or disperse dyestuffs.

Granular mixtures of vat dyestuffs and/or disperse dyestuffs are usually prepared by mixing commercial formulations of individual dyestuffs in the desired ratio in the dry state in mixing drums, anti-dust agents being added.

This procedure gives rise to high costs, since finishing and drying of the individual dyestuffs is then followed by the mixing and formulation in a separate apparatus. Furthermore, it is found that in comparison with the individual components, the quality of the dyestuff mixtures thus prepared with respect to their fine division, dispersion characteristics and dusting properties is diminished. This can probably be attributed to local damage to the dyestuffs by heating during the mixing operation, and increased abrasion of the granules in the mixing drums.

The new process for the production of granular mixtures of vat dyestuffs, and/or disperse dyestuffs is characterised in that liquid or pasty, finished formulations of two or more vat dyestuffs and/or disperse dyestuffs are dried.

Surprisingly, the new process avoids the abovementioned deficiencies and offers further advantages. The granular mixtures obtained by the process according to the invention are readily dispersible and are homogeneous.

Thus, the dispersion characteristics of the granular dyestuff preparations produced by spray-drying the dyestuffs together are considerably better than those of preparations mixed in the dry state.

Variations in colour shade which can occur in the case of granules mixed in the dry state because of demixing operations arise. The fine division of the granules prepared by spray-drying the dyestuffs together is good, so that there is no danger of the formation of specks even in the case of light piece-dyeings. The dusting properties can be better influenced, since dust-removing processes which are in themselves known, such as removal of dust by emulsifying, and sifting, can be applied when spray-drying the dyestuffs together. In this manner, the frequently desired free-flowing properties are retained in the case of granules, whilst in the case of dry mixing anti-dust agents must be added in order to avoid the fine dust (abraded material) formed during mixing.

In carrying out the new process, the dyestuffs which make up the mixture can either be finished separately and, after formulating and mixing, dried together, or the dyestuffs can be finished together and the mixture dried after the formulation.

The process according to the invention is preferably used for the production of readily dispersible and homogeneous mixtures of disperse dyestuffs and vat dyestuffs, a possible procedure being, for example, to finish two or more disperse dyestuffs and/or vat dyestuffs separately and to mix them in portions after grinding in a bead mill, to adjust the mixture to a desired shade and intensity and then to dry it. In an advantageous modification of the process, it is also possible to finish dyestuff presscakes together, in the desired composition, and then to dry the mixture. Pressure-jet drying is carried out, to give granules.

EXAMPLE 1

167 g of C.I. Vat Brown 3 paste, obtained by grinding in a bead mill, and 136 g of C.I. Vat Black 27 paste, obtained by grinding in a bead mill, are mixed and an antidust agent is added; the solids content is determined. The dispersion is then adjusted to the desired tinctorial strength with a dispersing agent and is spray-dried to granules in a pressure-jet drier.

EXAMPLE 2

38.8 g of C.I. Vat Yellow 12 paste, obtained by grinding in a bead mill, and 31.96 g of C.I. Disperse Yellow 66 paste, obtained by grinding in a bead mill, are mixed and 0.5% of an anti-dust agent is added. The solids content of the dispersion is determined, and the dispersion is adjusted to the desired tinctorial strength with suitable dispersing agents. The dispersion is then spray-dried to granules in a pressure-jet drier.

EXAMPLE 3

38.5 g of C.I. Disperse Yellow 66 presscake (containing 10.2 g of dyestuff), 42.8 g of C.I. Disperse Red 106 presscake (containing 19.2 g of dyestuff) and 66.1 g of Disperse Blue 139 presscake (containing 26.8 g of dyestuff) are mixed, a dispersing agent, an anti-dust agent and if appropriate other additives are added and the dyestuffs are finished together. The dyestuff dispersion is then spray-dried to granules.

We claim:

1. Process for the production of granular mixtures of vat dyestuffs and/or disperse dyestuffs, characterised in that liquid or pasty, finished formulations of two or more vat dyestuffs and/or disperse dyestuffs are spray-dried together to form granules.

2. Process according to claim 1, characterised in that the dyestuffs are finished separately and, after formulation, the mixture is dried.

3. Process according to claim 1, characterised in that the dyestuffs are finished together and, after formulation, the mixture is dried.

4. Mixtures of vat dyestuffs and/or disperse dyestuffs obtainable by the processes of any one of claims 1 to 3.

5. A process according to claim 1, wherein a mixture of disperse dyestuffs is spray dried together to form granules.

6. A process according to claim 1, wherein a mixture of vat dyestuffs is spray dried together to form granules.

7. A process according to claim 1, wherein a mixture of a vat dyestuff and a disperse dyestuff is spray dried together to form granules.

* * * * *